United States Patent

Benson, Jr. et al.

[11] Patent Number: 6,119,807
[45] Date of Patent: Sep. 19, 2000

[54] SOUND ABSORBING ARTICLE AND METHOD OF MAKING SAME

[75] Inventors: Vernon C. Benson, Jr., Arnold; Glenn E. Freeman, Tarentum, both of Pa.

[73] Assignee: PPG Industries Ohio, Inc., Cleveland, Ohio

[21] Appl. No.: 09/084,143

[22] Filed: May 26, 1998

Related U.S. Application Data

[62] Division of application No. 08/783,596, Jan. 13, 1997, Pat. No. 5,796,055.

[51] Int. Cl.[7] ....................................................... F16F 15/00
[52] U.S. Cl. ........................... 181/208; 181/290; 181/294
[58] Field of Search ..................................... 181/207, 208, 181/284, 286, 289, 290, 291, 292, 294; 428/34.6, 34.7, 415, 425.6, 425.9, 430

[56] References Cited

U.S. PATENT DOCUMENTS

| | | |
|---|---|---|
| 2,184,876 | 12/1939 | Sherts . |
| 3,640,833 | 2/1972 | Oberst et al. . |
| 3,783,084 | 1/1974 | Quenett . |
| 4,011,356 | 3/1977 | Lambert et al. . |
| 4,017,661 | 4/1977 | Gillery ................................... 428/415 |
| 4,047,351 | 9/1977 | Derner et al. . |
| 4,073,986 | 2/1978 | Keslar et al. . |
| 4,201,351 | 5/1980 | Tolliver . |
| 4,554,713 | 11/1985 | Chabal . |
| 4,614,676 | 9/1986 | Rehfeld . |
| 4,778,028 | 10/1988 | Staley . |
| 4,810,583 | 3/1989 | Brown et al. . |
| 4,923,757 | 5/1990 | O'Dwyer et al. . |
| 5,132,367 | 7/1992 | Chen . |
| 5,262,232 | 11/1993 | Wilfong et al. . |
| 5,368,917 | 11/1994 | Rehfeld et al. . |
| 5,584,950 | 12/1996 | Gaffigan . |
| 5,700,527 | 12/1997 | Fuchs et al. . |
| 5,712,038 | 1/1998 | Yamazaki et al. . |
| 5,773,102 | 6/1998 | Rehfeld . |
| 5,796,055 | 8/1998 | Benson, Jr. et al. . |
| 5,965,853 | 10/1999 | Hornsey . |

FOREIGN PATENT DOCUMENTS

| | | |
|---|---|---|
| 0 566 890 | 10/1993 | European Pat. Off. . |
| 0 418 123 | 6/1995 | European Pat. Off. . |
| 0 733 468 | 9/1996 | European Pat. Off. . |
| 0 750 078 | 12/1996 | European Pat. Off. . |
| 0 763 420 | 3/1997 | European Pat. Off. . |

*Primary Examiner*—Khanh Dang
*Attorney, Agent, or Firm*—Donald C. Lepiane

[57] ABSTRACT

A sound dampening glazing, for example an automotive windshield, in one embodiment of the invention includes a pair of glass sheets having facilities therebetween. In cross section and moving from one glass sheet to the other, the facilities include a polyvinyl butyral sheet, an intermediate sheet having a surface harder than the surface of the interlayer to smooth the interlayer surface e.g. an intermediate polyester sheet, a sheet of dampening material, a polyester sheet, a polyvinyl butyral sheet. In another embodiment, the automotive windshield has two sheets of dampening material, the sheets have sound dampening properties in different temperature ranges to as to provide the automotive windshield with sound dampening properties over a wider temperature range. Methods for making the glazings of the instant invention are also disclosed.

36 Claims, 2 Drawing Sheets

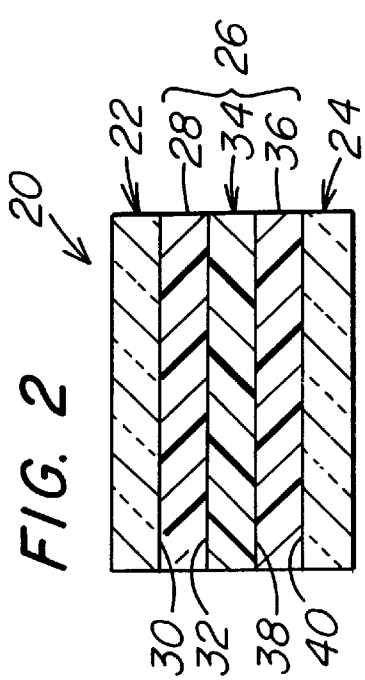
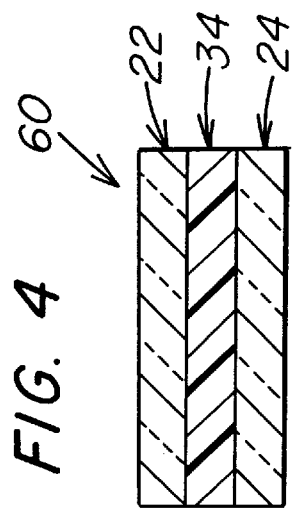
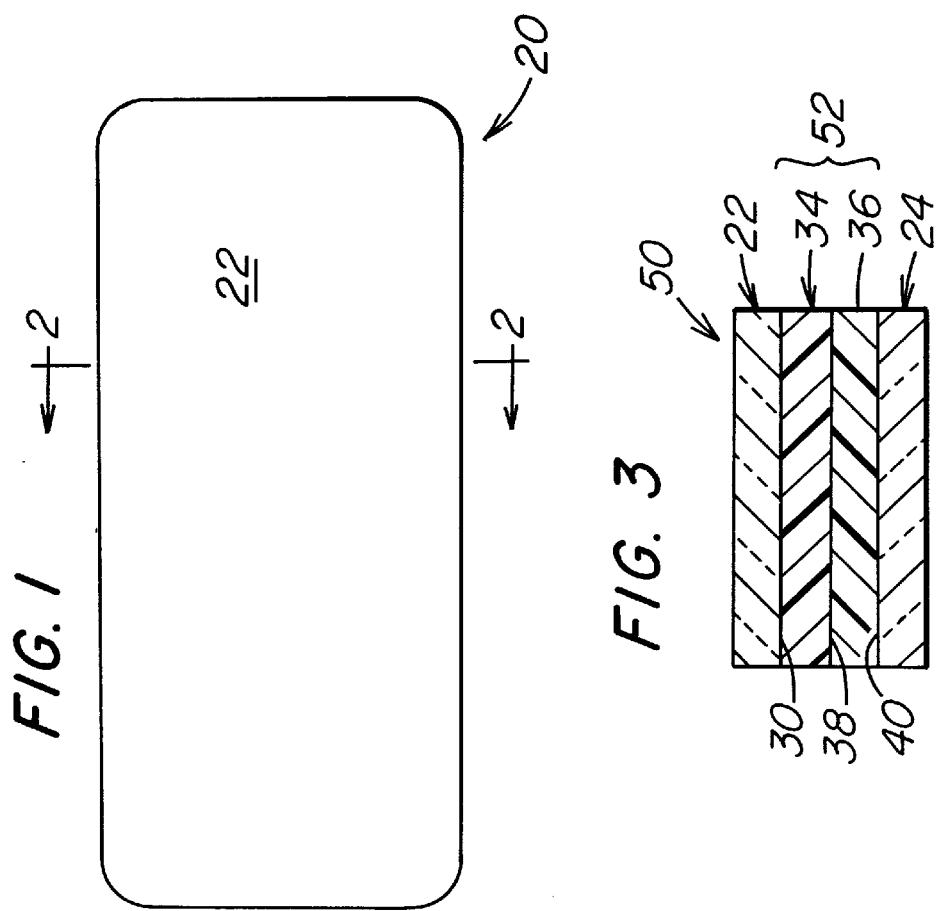
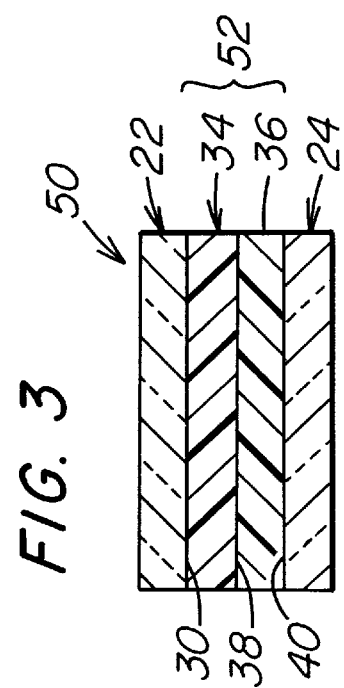

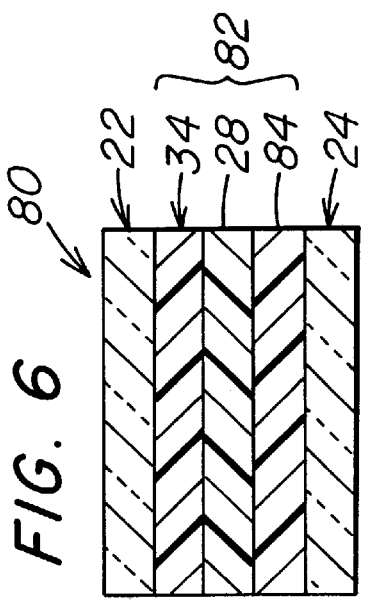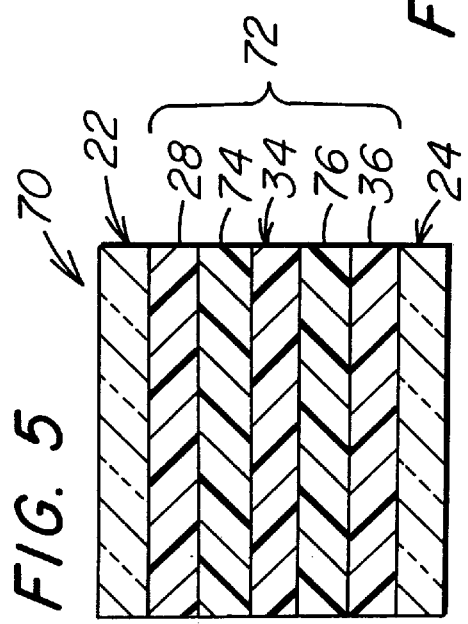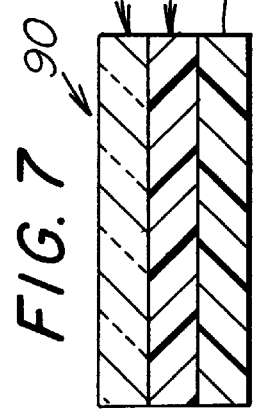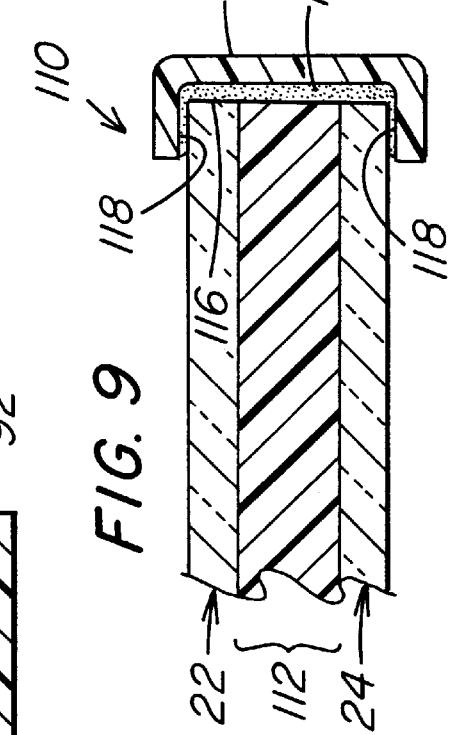

SOUND ABSORBING ARTICLE AND METHOD OF MAKING SAME

CROSS REFERENCE TO RELATED APPLICATION

This application is a divisional of U.S. patent application Ser. No. 08/783,596 filed Jan. 13, 1997 now U.S. Pat. No. 5,796,055.

BACKGROUND OF THE INVENTION

1. Field of the Invention

This invention relates to a sound absorbing article and, more particularly, to a glazing e.g. a windshield, side window and/or rear window of a vehicle, having vibration dampening or sound absorbing properties and method of making same.

2. Discussion of the Presently Available Technology

As can be appreciated by those skilled in the art, vibration can have damaging effects on products that cause performance loss and failure, and transmit noise resulting in human discomfort.

Materials are available that may be used to reduce vibrations. One product is a family of viscoelastic polymers sold by 3M Corporation under the marks IDS 110, ISD 112, ISD 113 and SJ 2015. These polymers are advertised for use in dampening vibrations in, among other things, buildings, cars, electronic equipment, photography equipment, and air and space crafts.

Of interest in the present discussion is dampening vibrations that are produced by aerodynamic flow and acoustic excitation in glazings e.g. vehicle glazings such as windshields, side windows and/or rear windows of land, sea, air and space vehicles. In the categories of automotive glazings or transparencies, side and rear windows may be monolithic tempered glass sheets, double glazed windows having sheets of tempered glass, or laminated glass sheets that may be annealed glass sheets or heat strengthened sheets, and windshields may be annealed glass sheets laminated together by a plastic interlayer and sheets of monolithic annealed glass sheet having an antilacerative sheet over a surface of the glass sheet facing the interior of the vehicle. The monolithic tempered glass sheets provide minimal sound absorption whereas the double glazed windows provide more sound absorption. The interlayer used in the fabrication of windshields in addition to being effective to secure fragments of glass in place in the event the glass sheet(s) is (are) broken provides the windshield with some sound dampening.

There have been efforts to improve the comfort of passengers in automobiles by reducing transmission of unwanted noise. These efforts have included making laminated glass having interlayer materials with enhanced sound absorbing properties. For example, European Patent Application Number 93104895.3, Publication Number 0 566 890 A1 (hereinafter EPA No. 93104895.3) and European Patent Application Number 95118423.3, Publication Number 0 733 468 A2 (hereinafter EPA No. 95118423.3) discuss automotive sound barrier windshields and panels, respectively.

EPA No. 93104895.3 presents a discussion of sound insulation performance of laminated glass and discloses an interlayer film for use in laminating glass that dampens vibrations. In general, sound insulation performance is measured as the transmission loss (loss factor) at varying frequencies. Sound insulation as discussed in EPA No. 93104895.3 is described in JIS A4708 as a constant value at 500 Hz or above, depending on the sound insulation grade. The sound insulation of glass plates substantially decreases in the frequency range centered around 2000 Hz because of the coincidence effect. The "coincidence effect" stands for the phenomenon wherein, when the sound wave hits the glass plate, the rigidity and the inertia of the glass plate cause propagation of transverse waves on the glass surface, and these transverse waves resonate with the incident sound, resulting in sound transmission.

As discussed in EPA No. 93104895.3 although conventional windshields are superior in terms of the prevention of scattered fragments, they do not avoid the reduction in sound insulating performance caused by the coincidence effect in the frequency range centered around 2000 Hz. On the other hand, based on the loudness-level contour, it is known that human hearing is much more sensitive to sound in the range of 1000–6000 Hz compared with other frequency ranges, indicating that it is important for purposes of sound control to eliminate the drop in sound insulating performance caused by the coincidence effect.

In order to improve the sound insulating performance of laminated glass, it is necessary to mitigate the coincidence effect described above to prevent the decreases in the minimum transmission loss caused by the coincidence effect (hereinafter, this minimum is referred to as the "TL value").

EPA No. 93104895.3 discloses various ways to prevent the decrease in the TL value, such as an increase in the mass of the laminated glass, multi-layered glass, segmentation of the glass area, improvement of the facilities to support the glass plate and improvement in the interlayer film for laminating the glass sheets.

As can be appreciated by those skilled in the art, it would be advantageous to provide articles e.g. glazings to dampen vibrations to reduce transmission noise that are additional products to the products presently available made using the available technology.

SUMMARY OF THE INVENTION

This invention relates to a sound dampening glazing e.g. an automotive glazing having a tempered glass sheet having a major surface and a sheet of vibration dampening material adhered to the major surface of the sheet wherein the sheet of dampening material is an acrylic viscoelastic polymer.

The invention also relates to a sound dampening article e.g. a panel for a window or wall having a first rigid sheet and a second rigid sheet. Facilities are provided for securing first and second sheets of vibration material to each other and between the rigid sheets with a major surface of the first sheet of dampening material in facing relationship to the first rigid sheet and a major surface of the second sheet of dampening material in facing relationship to the second rigid sheet. The first sheet of dampening material has predetermined vibration dampening properties different than the predetermined vibration dampening properties of the second sheet whereby the article is effective to dampen vibrations over vibration dampening property range of the first and second sheets of vibration dampening material.

This invention further relates to a sound dampening article e.g. a windshield or a rear window having a first and second rigid member each having a major surface. Facilities are provided for maintaining a sheet of dampening material between the first and second rigid sheets to transmit vibrations acting on one rigid sheet through the sheet of dampening material to dampen the vibrations acting on the rigid sheet.

The invention still further relates to a method of making a sound dampening laminated article. The method includes the steps of placing a non-tacky sheet on opposed tacky surfaces of a sheet of dampening material. An interlayer and thereafter a glass sheet are positioned on each of the non-tacky sheets. Thereafter the sheets and interlayers are joined together to form the sound dampening article.

BRIEF DESCRIPTION OF THE FIGURES OF THE DRAWING

FIG. 1 is a front elevated view of an article incorporating features of the invention.

FIG. 2 is a view taken along line 2—2 of FIG. 1.

FIGS. 3–8 are views similar to the view of FIG. 2 illustrating various embodiments of the invention.

FIG. 9 is a fragmented view similar to the view of FIG. 2 showing a molding around edges of the article.

DETAILED DESCRIPTION OF THE INVENTION

Shown in FIG. 1 is a front elevated view of an article 20 incorporating features of the invention. As will be appreciated, the invention is not limited to any specific article, and the invention may be practiced to reduce vibrations to prevent damage to equipment and/or to reduce noise pollution. By way of example, but not limiting to the invention, the article 20 may be a window for any type of structure e.g. a home, skyscraper and/or a shed; a window for any type of vehicle e.g. land, sea, undersea, air and/or space vehicle, and/or may be an outer covering for a structure and/or vehicle e.g. a wall, a housing, an aircraft skin and/or a car body.

With reference to FIG. 2, the article 20 includes a sheet 22 hereinafter referred to as outer sheet 22 and a sheet 24 hereinafter referred to as the inner sheet 24. The designations "outer sheet" and "inner sheet" are not limiting to the invention and used for convenience to reference the sheet facing the interior of the structure and/or vehicle which is the "inner sheet" and the sheet facing the exterior of the structure and/or vehicle which is the "outer sheet". Facilities 26 incorporating features of the invention and to be discussed in more detail below join the outer and inner sheets 22 and 24 together.

The sheets 22 and 24 may be made of any material e.g. glass, metal, plastic, refractory or combinations thereof. Further, the sheets, in particular glass sheets, may be made of clear glass, colored glass, coated glass and glass having additives to absorb selective wavelengths of the solar spectrum; the glass sheets may be thermally tempered, heat strengthened, chemically tempered and/or annealed, and the glass sheets may be flat or bent. The sheets 22 and 24 may be of any thickness; however, as can be appreciated by those skilled in the art, increasing the thickness of the sheets to dampen vibrations increases the weight of the article 20.

In the following discussion, but not limiting to the invention, the article 20 is a transparency or glazing e.g. a windshield, side window, back window, and/or canopy for a vehicle.

With continued reference to FIG. 2, in this embodiment of the invention, the facilities 26 include an interlayer 28 adhered to major surface 30 of the outer sheet 22 and to major surface 32 of a sheet 34 of a sound dampening material and an interlayer 36 adhered to opposite surface i.e. major surface 38 of the sound dampening sheet 34 and major surface 40 of the inner sheet 24. The interlayers 28 and 36 are not limiting to the invention and are made of a material that adheres the outer and inner sheets 22 and 24 to the sound dampening sheet 34. In the instance where the sheets 22 and 24 are glass sheets e.g. the article 20 is an automotive windshield, the interlayers 28 and 36 are selected to preferably maintain fragments of glass in position i.e. prevents glass and/or plastic fragments from becoming projectiles, in the event the outer and/or inner glass sheets are fractured. As can be appreciated, the later feature is of particular interest when the sheets 22 and 24 are made of annealed glass. The interlayers 28 and 36 may be sheets of plasticized polyvinyl butyral, may be sheets of ethylene vinyl acetate, hereinafter referred to as "EVA" or may be sheets of urethane of the type used in the manufacture of automotive glazings such as windshields. In the instance when the glazing 20 is bent the interlayers 26 and 36 may be differentially stretched e.g. as disclosed in U.S. Pat. Nos. 4,201,351 and/or 4,554,713. The disclosures of U.S. Pat. Nos. 4,201,351 and 4,554,713 are hereby incorporated by reference.

The sheet 34 of dampening material may be made of any dampening material e.g. dampening materials sold by 3M Corporation e.g. acrylic viscoelastic polymers sold under the marks ISD 110, ISD 112, ISD 113 and SJ 2015 or dampening material sold by E.A.R. Specialty Composites, a division of Cabot Safety Corporation e.g. a family of polyurethane estomers sold under the mark ISOLOSS and ISODAMP.

As was discussed supra, the thickness of the glazing 20, the outer sheets 22 and 24, the interlayers 28 and 36, and the sheet 34 of the dampening material are not limiting to the invention. In the instance when the article 20 is an automotive windshield, the glass sheets 22 and 24 are usually made of bent or flat annealed glass sheets having a thickness in the range of 0.079 to 0.465 inch (2.0 to 11.8 millimeters (mm)), preferably 0.079 to 0.098 inch (2.0 to 2.5 mm), and most preferably 0.087 to 0.094 inch (2.2 to 2.4 mm). In the instance when the article 20 is an automotive side window or rear window, the sheets 22 and 24 are thermally tempered flat or bent glass sheets having a thickness in the range of 0.059 to 0.098 inch (1.5 to 2.5 mm), preferably 0.071 to 0.087 inch (1.8 to 2.2 mm) and most preferably 0.075 to 0.083 inch (1.9 to 2.1 mm). One or both of the sheets 22 and 24 may have a black border around the marginal edges to prevent degradation of the underlying adhesive that secures the glazing to the body of the vehicle.

In the instance when the article 20 is an automotive glazing, the interlayers 28 and 36 have a thickness in the range of 0.0004 to 0.0020 inch (0.010 to 0.050 mm), preferably 0.0004 to 0.0012 inch (0.010 to 0.030 mm) and more preferably 0.0006 to 0.00062 inch (0.014 to 0.016 mm), and the sheet 34 of the dampening material has a thickness in the range 0.001 to 0.020 inch (0.0254 to 0.508 mm), preferably 0.001 to 0010 inch (0.0254 to 0.254 mm) and more preferably 0.001 to 0.002 inch (0.0254 to 0.0504 mm). In the instance when the article is an aircraft glazing, the sheet of dampening material has the above discussed thickness range and preferred thickness range, and a more preferred thickness range 0.001 to 0.006 inch (0.0254 to 0.1512 mm).

Forty-nine (49) samples were made having the cross section shown in FIG. 2. All the samples were made using flat glass sheets 22 and 24 having a thickness of 0.09 inch (2.3 mm). Samples 1–7 were made using glass sheets 22 and 24 sold by PPG Industries, Inc. under the trademark Solex, and samples 8–49 were made using clear glass sheets 22 and 24. Sample 1 had peripheral dimensions of 6 by 12 inches ((0.15 by 0.30 meter); samples 2–11 had peripheral dimensions of 2 by 2 feet (0.60 by 0.60 meter), and samples 11–53 had peripheral dimensions of 12 by 12 inches (0.30 by 0.30 meter). All the samples had dampening sheet 34 of ISD 112 polymer sold by 3M Corporation. The dampening sheet of samples 1–49 was 0.002 inch (0.05 mm). The samples were fabricated by positioning the interlayer sheets 28 and 36 on each side of the dampening sheet 34. The dampening sheet of ISD 112 polymer had pressure sensitive surfaces and required only pressing of the interlayer sheets and dampening sheet together to effect a bond therebetween. Thereafter the glass sheets 22 and 24 were positioned about the interlayer sheets 28 and 36. The assemblies were prepressed using blankets of the type used in the automotive laminating art to draw air from between the sheets and seal the edges. Thereafter the assembly having the sealed edges was laminated in an air autoclave. The prepressing and laminating techniques are those normally used in the art of manufacturing laminated automotive windshields.

After laminating, the samples were visually inspected and orange peel was observed. "Orange peel" as the term indicates is a surface having concave portions similar to the skin of an orange. It is believed that the orange peel resulted from the ridges in the surface of interlayer material not being smoothed during laminating and/or the index of refraction of the interlayer material and the sheet of dampening material being different. More particularly, the sheets of interlayer have ribbed surfaces to assist in the escape of air during prepressing. The ribbed surfaces are smoothed out when pressed between sheets of glass because glass sheets provide a hard surface. More particularly, the surfaces of two sheets are pressed against one another and one surface of the sheet e.g. the interlayer sheet moves into the surface of the other sheet e.g. the dampening sheet, the ribbed surface of the interlayer is not smoothed. In other words the surface contour of the interlayer is substantially unchanged. The surface moving into the other surface is the "hard surface", and the other surface is the "soft surface". In the foregoing example, the sheet of dampening material has the soft surface, and the interlayer has the hard surface because the ribbed surface of the interlayer is not smoothed.

As can now be appreciated in the instance when the interlayer material and sheet of dampening material are not sufficiently different in hardness to smooth the ridges in the the interlayer material, orange peel may be eliminated by providing the interlayer material and the sheet of dampening material with substantially the same index of refraction. Further, the glass has an index of refraction substantially similar to that of the interlayer material normally used in the lamination of automotive windshields. Further the index of refraction for the laminated material and the sheet 34 are different, which may have further contributed to the laminate having orange peel. Table 1 shows particulars of the samples, and the results of the various tests conducted on the samples.

TABLE 1

| Samples | Material of Interlayer Sheets 28 and 36 | Thickness of Interlayer Sheets 28 and 36 in Inches | Results of Acoustics Test | Results of Impact Test | Results of Exposure Test |
|---|---|---|---|---|---|
| 1 | PVB | 0.015/0.015 | | | P |
| 2 | PVB | 0.015/0.015 | | | |
| 3 | PVB | 0.015/0.015 | | | |
| 4 | PVB | 0.015/0.015 | [4]X | | |
| 5 | PVB | 0.015/0.015 | | | |
| 6 | PVB | 0.015/0.015 | X | | |
| 7 | PVB | 0.015/0.015 | | | |
| 8 | PVB | 0.015/0.015 | X | | |
| 9 | PVB | 0.015/0.015 | | | |
| 10 | PVB | 0.015/0.015 | | AS1-F | |
| 11 | PVB | 0.015/0.015 | | AS1-F | |
| 12 | PVB | 0.015/0.015 | | AS1-F | |
| 13 | PVB | 0.015/0.015 | | AS1-F | |
| 14 | PVB | 0.015/0.015 | | AS1-F | |
| 15 | PVB | 0.015/0.015 | | AS1-F | |
| 16 | PVB | 0.015/0.015 | | AS1-F | |
| 17 | PVB | 0.015/0.015 | | AS1-F | |
| 18 | PVB | 0.015/0.015 | | AS1-F | |
| 19 | PVB | 0.015/0.015 | | AS1-F | |
| 20 | PVB | 0.030/0.030 | | AS1-P | |
| 21 | PVB | 0.030/0.030 | | AS1-P | |
| 22 | PVB | 0.030/0.030 | | AS1-P | |
| 23 | PVB | 0.030/0.030 | | AS1-P | |
| 24 | PVB | 0.030/0.030 | | AS1-P | |
| 25 | [2]EVA | 0.018/0.018 | | AS1-F | |
| 26 | EVA | 0.018/0.018 | | AS1-F | |
| 27 | EVA | 0.018/0.018 | | AS1-F | |
| 28 | EVA | 0.018/0.018 | | AS1-F | |
| 29 | EVA | 0.018/0.018 | | AS1-F | |
| 30 | [3]URE | 0.015/0.015 | | AS1-P | |
| 31 | URE | 0.015/0.015 | | AS1-P | |
| 32 | URE | 0.015/0.015 | | AS1-P | |
| 33 | URE | 0.015/0.015 | | AS1-P | |
| 34 | URE | 0.015/0.015 | | AS1-P | |
| 35 | EVA | 0.010/0.010 | | AS1-F | |
| 36 | EVA | 0.010/0.010 | | AS1-F | |
| 37 | EVA | 0.010/0.010 | | AS1-F | |
| 38 | URE | 0.015/0.015 | | | F |
| 39 | EVA | 0.015/0.015 | | | F |
| 40 | EVA | 0.015/0.015 | | AS1-F | |
| 41 | EVA | 0.015/0.015 | | AS1-F | |
| 42 | EVA | 0.015/0.015 | | AS1-F | |
| 43 | EVA | 0.015/0.015 | | AS1-F | |
| 44 | EVA | 0.015/0.015 | | AS1-F | |
| 45 | EVA | 0.015/0.015 | | AS1-F | |
| 46 | EVA | 0.015/0.015 | | AS1-F | |
| 47 | EVA | 0.015/0.015 | | AS1-F | |
| 48 | EVA | 0.015/0.015 | | AS1-F | |
| 49 | EVA | 0.015/0.015 | | AS1-F | |

NOTES:
[1]PVB means polyvinyl butyral
[2]EVA means ethyl vinyl acetate
[3]URE means urethane
[4]"X" means a test was conducted and the results discussed below Samples 1, 38 and 39 were tested for exposure. More particularly, sample 1 was tested for performance in high humidity. The humidity was conducted pursuant to Federal Motor Vehicle Safety Standard (FMVSS) 205 and sample 1 showed no visible degradation and is considered to have passed the test. Samples 38 and 39 were tested for performance in boiling water. The test was conducted pursuant to FMVSS 205. Both samples are considered to have failed the test because air bubbles were observed throughout the laminate.

Although the failure of samples 38 and 39 is not completely understood, it is believed the samples 42 and 43 failed because the surfaces of the urethane and EVA were not embossed or rigid and therefore air between the sheets was not removed during prepressing. It is believed the samples would have passed the test had the surfaces of the interlayer been embossed.

Sample 4 was aeroacoustic tested by Cornell University. The control sample for all acoustical tests discussed herein was a monolithic sheet of glass of the type sold by PPG Industries, Inc. under the tradename Solex. the sheet has a thickness of 0.160 inches (4.1 mm). The control sample performance was the baseline for the tests discussed herein. Sample 4 had an average improvement in noise reduction of 7.2 decibels (dB). Sample 5 was a backup to sample 4 and was not tested.

Sample 6 was tested pursuant to ASTM E-90—90. The control sample had a Sound Transmission Class (STC) rating of 28 and sample 6 had a rating of 34. The higher the rating, the better the sound insulating quality. Samples 2, 3, 7 and 9 were backup samples to sample 6 and were not tested.

Sample 8 was tested pursuant to Society of Automotive Engineers (SAE) J 1400. Sample 8 had an average improvement of 4.5 dB over the control sample.

The impact resistance test was conducted pursuant to MVSS 205. The designation "F" on the table means the sample failed the test, and the designation "P" on the table means the sample passed the test. It is believe the sample having EVA interlayers failed because the material was not strong enough to resist penetration. However, thicknesses greater than 0.030 inch (0.8 mm) are expected to pass the test. The samples using PVB having a thickness of 0.030 inch (0.8 mm) passed whereas PVB having thickness of 0.015 inch (0.4 mm) failed indicating that thicker PVB is preferred.

With reference to FIG. 3, there is shown another embodiment of the invention. Glazing 50 shown in FIG. 3 has the sheets 22 and 24 joined together by facilities 52. The facilities 52 include the sheet 34 of dampening material adhered to the surface 30 of the outer sheet 22, and the surface 38 of the sheet 34 of dampening material to the interlayer 36. The interlayer 36 is adhered to the major surface 40 of the inner sheet 24.

One sample having the cross section shown in FIG. 3 was constructed. The sample was made of flat clear glass sheets having a thickness of 0.09 inch (2.3 mm). The dampening sheet 34 was ISD 112 polymer sold by 3M Corporation having a thickness of 0.002 inch (0.05 mm). The interlayer 34 was polyvinyl butyral purchased from Monsanto Company and had a thickness of 0.030 inch (0.76 mm).

Samples of the glazing 50 shown in FIG. 3 were fabricated as follows. The sheet 34 of ISD 112 dampening material was positioned on the glass sheet 22. The interlayer sheet 36 was positioned on the surface of the dampening material and the outer glass sheet 24 placed over the interlayer sheet 36. The assembly was laminated as previously discussed. After laminating, the samples were visually inspected, and orange peel was observed. This sample was not tested for acoustical performance.

In FIG. 4 there is shown a further embodiment of the invention. Glazing 60 shown in FIG. 4 has the glass sheets 22 and 24 adhered together by the sheet 34 of dampening material.

Two samples of the glazing 60 shown in FIG. 4 were made using ISD 112 polymer sold by 3M Corporation as the sheet of dampening material, and four samples were made using Isodamp C 1002 material sold by E.A.R. Specialty Composites, a division of Cabot Safety Corporation as the sheet of dampening material. The samples were laminated as previously discussed. The samples using ISD 112 polymer were made of flat glass sheets 22 and 24 of the type sold by PPG under the trademark Solex having a thickness of 0.09 inch (2.3 mm) and peripheral dimension of 24 by 24 inches (0.60 by 0.60 meter). One samples had a sheet of ISD 112 polymer 0.010 inch (0.25 mm) thick and the other had a sheet of ISD 112 polymer 0.002 inch (0.050 mm) thick.

The sample having the sheet of ISD 112 polymer having a thickness of 0.010 inch (0.25 mm) was tested for sound dampening pursuant to ASTM E-90—90 and subject to an aeroacoustics test by Cornell University. The sample had an ASTM E-90—90 STC rating of 34 and had a noise reduction of 6.2 dB according to the aeroacoustic test. The samples did not have orange peel.

The samples using Isodamp C 1002 were made of clear flat glass having a thickness of 0.09 inch (2.3 mm). The Isodamp C 1002 for each sample had a thickness of 0.030 inch (0.8 mm). Two samples using Isodamp C 1002 had peripheral dimensions of 12 by 12 inches (0.30 by 0.30 meter) and the other two samples had peripheral dimensions of 24 by 24 inches (0.60 by 0.60 meter).

Each of the samples had voids between the glass sheet and the sheet of Isodamp C 1002. These samples are considered not acceptable for automotive glazing as having trapped air bubbles between the glass sheets which most likely will result in delamination. It is believed air was trapped between the sheets causing the voids because the sheets of Isodamp C 1002 are smooth making removal of air during laminating difficult. As can be appreciated, use of an adhesive to join the glass sheet to the sheet 34 may eliminate the problem caused by trapped air. One 24 by 24 inch (0.60 by 0.60 meter) sample having Isodamp C 1002 was tested for acoustics pursuant to ASTM E-90—90 and to the aeroacoustics test conducted by Cornell. The sample had a STC ranking of 34 and a noise reduction of 4.5 dB better than the control sample.

Isodamp C 1002 is a non-transparent material having a blue color. As can be appreciated, this material is not recommended for use in transparent glazings.

The samples using ISD 112 having the cross section shown in FIG. 4 did not have orange peel as no ribbed sheet e.g. interlayer was used to secure the sheets together. Although the design of the glazing 60 is acceptable for side windows and rear windows that use tempered glass sheets, it is not preferred for automotive windshields that use annealed glass sheets because there are no provisions for retention of glass particles.

Before discussing glazing 70 shown in FIG. 5, the following background will enhance an appreciation of the embodiment of the invention shown in FIG. 5.

As previously mentioned, 3M Corporation offers several types of viscoelastic polymer e.g. under the marks SJ 2015, ISD 112, ISD 113 and ISD 110. The polymers sold under the marks SJ 2015, ISD 112 and ISD 113 are pressure sensitive viscoelastic polymers that require only rolling with a roller or squeegee to effect a good bond between the polymer sheet and another sheet or substrate. The polymer sold under the mark ISD 110 is tack-free at room temperature. Heat and pressure are required to bond sheets of ISD 110 polymer to another sheet or substrate. As can be appreciated, when selecting a dampening material for use in a production process, it is preferred to use a material that is tack-free so that sheets are easy to handle and do not stick together. Further there is less probability of wrinkling a tack-free sheet when rapidly applying it to another sheet or substrate than a sheet that has a tacky surface.

As the terms are used herein, a "tacky surface" is a surface that is sticky at room temperature and/or requires minimal pressure to adhere to another surface; and a "non-tacky surface" is a surface that is not sticky at room temperature and requires heating, more than minimal pressure and/or adhesive to adhere it to another surface.

From the foregoing discussion it can be appreciated that ISD 110 or other non-tacky materials are preferred;

however, in selecting the dampening material, it is also important that the material selected dampen within the temperature range of expected use of the article or glazing.

As advertised by 3M, ISD 110 polymer has a loss factor of about 0.9 in the temperature range of about 104° F. (40° C.) to about 140° F. (60° C.). ISD 112 polymer has a loss factor of about 1 in the temperature range of about 50° F. (10° C.) to about 113° F. (45° C.). A loss factor of 1 or greater is preferred to dampen vibrations that cause noise transmission. From a temperature and loss factor, ISD 112 polymer is preferred; however, from a handling standpoint ISD 110 polymer is preferred. The embodiment of the glazing 70 shown in FIG. 5 may be used to eliminate the limitation of having a sheet of dampening material that has a tacky surface, may also be used to eliminate orange peel, and/or may be used to prevent migration of undesirable components (discussed in detail below).

Glazing 70 shown in FIG. 5 has the sheets 22 and 24 secured together by facilities 72. The facilities 72 include the interlayers 28 and 36, the dampening sheet 34 and intermediate sheets 74 and 76. The intermediate sheet 74 is between and adhered to the dampening sheet 34 and interlayer 28, and the intermediate sheet 76 is between and adhered to the dampening material 34 and the interlayer 36. In the instance where the intermediate sheets are used for ease of handling a dampening sheet having a tacky surface, the intermediate sheets 74 and 76 are made of any material that is tack-free for example plastic, metal, wood, glass, or ceramic. In the instance where the sheets 22 and 24 are annealed glass sheets it is preferred that the sheets 74 and 76 have a hard surface to smooth the ridges in the interlayers 28 and 36 as previously discussed. As can now be appreciated intermediate sheets 74 and 76 may be used with tack-free dampening material to smooth ridges in the interlayer. Materials that have a hard surface and may be used to smooth ridges are plastics, metal, wood, glass or ceramics.

In the instance where the interlayers 28 and 36 are made of a material that has component(s) that may migrate from the interlayer into the dampening sheet and deteriorate the dampening sheet, the intermediate sheets 74 and 76 should act as a barrier to prevent such migration. By way of example and not limiting to the invention, an interlayer of plasticized polyvinyl butyral was a base upon which a viscoelastic polymer was applied and then subsequently cured. The cured polymer deteriorated. The deterioration of the ISD 112 polymer is believed to be a result of the plasticizer migrating out of the interlayer into the polymer causing chemical deterioration. Intermediate sheets 74 and 76 of plastic, metal, wood, glass and ceramics that are non-reactive to the polymer may be used to prevent chemical migration that may deteriorate the dampening sheet.

As can be appreciated when selecting a material for the intermediate sheets 74 and 76, the final use of the article needs to be considered. For example, if the article is a glazing, the intermediate sheets 74 and 76 in addition to meeting the above requirements need to be transparent and the and the index of refraction of the layers similar to that of the glass sheets. In this instance, the intermediate sheets 74 and 76 may be glass or plastic e.g. polyester, ethylene vinyl acetate. In the practice of the invention, sheets of polyester were used because they had a hard smooth surface to smooth ridges of the interlayer material; they are transparent, they are non-tacky, they have an index of refraction similar to glass, they provide improved penetration resistance, they may be tinted, coated for aesthetic and solar control and they prevent migration of the plasticizer used in plasticized polyvinyl butyral interlayers.

The thickness of the intermediate sheets 74 and 76 are not limited to the invention and for automotive glazing may have a thickness in the range of 0.0005 inch (0.013 mm) to 0.020 inch (0.26 mm), preferably in the range of 0.001 inch (0.025 mm) to 0.015 inch (0.38 mm) and most preferably in the range of 0.001 inch (0.025 mm) to 0.010 inch (0.25 mm). As can be appreciated for certain materials, increasing the thickness increases the stiffness. The above thickness ranges are acceptable for, but not limiting to, intermediate sheets of polyester.

Twenty-six (26) samples were made having the cross section of the glazing 70 shown in FIG. 5. Samples 1–12 were made of clear glass sheets 22 and 24 and samples 13–26 were glass sheets 22 and 24 sold by PPG Industries, Inc. under the trademark Solex. The glass sheets of samples 1–12 had a thickness of 0.09 inch (2.3 mm), and the glass sheets of samples 13–26 had a thickness of 0.08 inch (2.1 mm). Samples 1–14 were made of flat glass and samples 15–26 were made of bent glass. Samples 1–10 had peripheral dimensions of 12 by 12 inches (0.3 by 0.3 meter), and samples 11–14 had peripheral dimensions of 24 by 24 inches (0.6 by 0.6 meter) and samples 15–26 were two car sets for the 1996 Chrysler Town and Country van. Each set included a window for the front door, cargo door and rear quarter for the passenger and driver side (for a total of 12 samples). Samples 1–14 having flat glass were laminated as previously discussed. Samples 15–26 having bent glass were laminated as follows. Each sample was placed in a plastic bag, and the bags having the assemblies were placed in an air autoclave. During laminating, a vacuum was applied to the bags to draw air from between the sheets, and thereafter the assembly was laminated. The dampening sheet was ISD 112 polymer sold by 3M Corporation. Samples 1–14 had a thickness of 0.002 inch (0.051 mm), and samples 15–26 had a thickness of 0.001 inch (0.025 mm). The sheets 28 and 36 of interlayer material for samples 1–4 was EVA and for samples 5–26 was polyvinyl butyral. The EVA and polyvinyl butyral each had a thickness of 0.015 inch (0.06 mm). The intermediate sheets 74 and 76 were each polyester having a thickness of 0.015 inch (0.06 mm). None of the samples had orange peel.

Samples 11 and 14 were tested for acoustics pursuant to SAE J 1400 and sample 11 had an average improvement of 3.0 dB over the control sample and sample 14 had an average improvement of 4.1 dB over the control sample. Samples 12 and 13 were tested pursuant to ASTM E90—90 and the STC ranking for samples 12 and 13 was 33. Samples 1–4 and 8–10 were impact resistance tested and passed. Samples 1 and 5–8 were tested humidity pursuant to MVSS 205 and passed.

TABLE 2

| Samples | Material of Interlayer Sheets 28 and 36 | Thickness of Interlayer Sheets 28 and 36 in Inches | Results of Acoustics Test | Results of Impact Test | Results of Exposure Test |
| --- | --- | --- | --- | --- | --- |
| 1 | EVA | 0.015/0.015 | | AS1-P | P |
| 2 | EVA | 0.015/0.015 | | AS1-P | |
| 3 | EVA | 0.015/0.015 | | AS1-P | |
| 4 | EVA | 0.015/0.015 | | AS1-P | |
| 5 | PVB | 0.015/0.015 | | | P |
| 6 | PVB | 0.015/0.015 | | | P |
| 7 | PVB | 0.015/0.015 | | | P |
| 8 | PVB | 0.015/0.015 | | AS2-P | |
| 9 | PVB | 0.015/0.015 | | AS2-P | |
| 10 | PVB | 0.015/0.015 | | AS2-P | |

TABLE 2-continued

| Samples | Material of Interlayer Sheets 28 and 36 | Thickness of Interlayer Sheets 28 and 36 in Inches | Results of Acoustics Test | Results of Impact Test | Results of Exposure Test |
|---|---|---|---|---|---|
| 11 | PVB | 0.015/0.015 | X | | |
| 12 | PVB | 0.015/0.015 | X | | |
| 13 | PVB | 0.015/0.015 | X | | |
| 14 | PVB | 0.015/0.015 | X | | |
| 15 | PVB | 0.015/0.015 | | | |
| 16 | PVB | 0.015/0.015 | | | |
| 17 | PVB | 0.015/0.015 | | | |
| 18 | PVB | 0.015/0.015 | | | |
| 19 | PVB | 0.015/0.015 | | | |
| 20 | PVB | 0.015/0.015 | | | |
| 21 | PVB | 0.015/0.015 | | | |
| 22 | PVB | 0.015/0.015 | | | |
| 23 | PVB | 0.015/0.015 | | | |
| 24 | PVB | 0.015/0.015 | | | |
| 25 | PVB | 0.015/0.015 | | | |
| 26 | PVB | 0.015/0.015 | | | |

With reference to FIG. 6, there is shown another embodiment of the invention. Glazing 80 shown in FIG. 6 has the sheets 22 and 24 joined together by facilities 82. The facilities 82 include two sheets 34 and 64 of dampening material and one sheet 28 of interlayer material. The glazing 80 shown in FIG. 6 was not constructed and tested; however, it is expected to have acceptable dampening properties because it employs two sheets of dampening material. It is also expected to have orange peel.

With continued reference to FIG. 6, the glazing 80 is shown having two sheets 34 and 84 of dampening material. The sheets of dampening material may have a loss factor over different temperature ranges. For example, using ISD 112 polymer as the dampening sheet 34 and ISD 113 polymer as the dampening sheet 84, the glazing would have a loss factor of at least about 1.0 for the temperature range of 14° F. (−10° C.) to 122° F. (50° C.). ISD 113 polymer has a loss factor of greater than about 1 in the temperature range of about 14° F. (−10° C.) and 68° F. (20° C.).

As can be appreciated, the intermediate sheets 74 and 76 may be used on one or both sides of the interlayer sheet 28 shown in FIG. 5 for purposes discussed above in regards to FIG. 5.

Referring to FIG. 7 there is shown another embodiment of the invention. Glazing 90 shown in FIG. 7 includes the sheet 22, the dampening material 34 and a sheet 92 of antilacerative material of the type known in the automotive windshield art. For example, the antilacerative sheet 92 may be the type used in the automotive art. As can be appreciated, the antilacerative sheet 92 may be used on outer surface of any of the glazings 20, 50, 60, 70, 80 and 100 shown in FIGS. 1–6 and 8.

Two samples of the glazing 90 having the cross section in FIG. 7 were constructed and tested. Each sample had a sheet 22 of glass sold by PPG Industries, Inc. under the trademark Solex and a thickness of 4.1 mm and peripheral dimension of 2 by 2 feet (0.60 by 0.60 meter). The dampening material was ISD 112 polymer sold by 3M Corporation having a thickness of 0.002 inch (0.05 mm). One sample had a poly vinyl butyral having a thickness of 0.030 inch (0.75 mm) on the dampening sheet and a sheet of poly(ethylene terephthalate) ("PET") having a thickness of 0.010 inch (0.25 mm) on the polyvinyl butyral. The other sample had a transparent polycarbonate sheet having a thickness of 0.030 inch on the sheet of ISD 112 polymer having a thickness of 0.002 inch (0.05 mm). The sample having the poly vinyl butyral and PET sheet were tested for acoustics pursuant to ASTM E-90—90 and had an STC ranking of 29, and the aeroacoustic test conducted by Cornell University had a noise reduction of 2.5 dB.

Referring now to FIG. 8, there is shown another embodiment of the invention. Glazing 100 shown in FIG. 8 for purposes of discussion is a cross section of an aircraft transparency. The glazing 100 includes chemically strengthened glass sheets 22 and 24, sheets 102 and 104 to prevent cold chipping of the glass sheets 22 and 24 due to differences in temperature coefficient of the materials of the glazing, a sheet 106 of polyvinyl butyral and the dampening sheet 34. Aircraft transparencies of the type shown in FIG. 8 less the dampening sheet are disclosed in U.S. Pat. Nos. 4,073,986 and 4,810,583 which disclosures are hereby incorporated by reference.

With continued reference to FIG. 8, in place of or in addition to the dampening sheet 34 between the glass sheets 22 and 24, a dampening sheet may be mounted on the outer surface of the laminate 100 using the arrangement shown for glazing 90 of FIG. 7. As can be appreciated by those skilled in the art, a plastic stiffener may be used over the dampening sheet in place of the antilacerative sheet 92 shown in FIG. 7.

With reference to FIG. 9, there is shown glazing 110 having outer sheets 22 and 24 joined together by facilities 112. The facilities 112 may be any of the facilities shown in the Figures. and discussed.

A molding 114 of the type known in the art is placed around the edges of the glazing 110 or injection molded around and on the peripheral edges 116 and marginal edges 118 of the glazing 110. The molding around the glazing may be used as a barrier to the ambient environment and atmosphere. Further a moisture and/or gas impervious sealant or adhesive 120 of the type used in double glazed unit e.g. as taught in EP Patent No. 0 475 213 which teachings are hereby incorporated by reference may be used to secure the molding to the periphery of the article and/or marginal edges of the outer sheets 22 and 24.

As can now be appreciated, the above embodiments of the invention were presented for purposes of illustration and are not limiting to the invention. For example, features of each glazing shown in FIGS. 2–9 may be interchanged or used in combination with each other. The scope of the invention disclosed herein is defined by the following claims.

What is claimed is:

1. A glazing, comprising:
   a glass sheet having a major surface, and
   a sheet of vibration dampening material adhered to the major surface of the sheet, wherein the sheet of dampening material is an acrylic viscoelastic polymer.

2. The glazing according to claim 1 wherein the sheet of dampening material is a product of 3M Corporation sold for dampening vibrations.

3. The glazing according to claim 1 wherein the sheet of dampening material has a major surface defined as a first major surface and an opposite major surface defined as a second major surface with the first major surface of the sheet of dampening material adhered to the major surface of the glass sheet and further including a protective sheet over to the second major surface of the sheet of dampening material.

4. The glazing according to claim 3 wherein the protective sheet is a plastic sheet having antilacerative properties.

5. The glazing according to claim 3 wherein the protective sheet is a glass sheet, with major surface of the glass sheet adhered to the second major surface of the sheet of dampening material.

6. The glazing according to claim 5 wherein the glass sheets are tempered glass sheets.

7. The glazing according to claim 1 wherein the glazing is a transparency.

8. The glazing according to claim 7 wherein the transparency is an aircraft window.

9. The glazing according to claim 7 wherein the transparency is an automotive window.

10. The glazing according to claim 7 wherein the transparency is a window.

11. The glazing according to claim 1 wherein at least one major surface of the glass sheet has a coating.

12. An article comprising:

a first rigid sheet;

a second rigid sheet;

a first sheet of vibration dampening material having predetermined vibration dampening properties;

a second sheet of vibration dampening material having predetermined vibration dampening properties different than the predetermined vibration dampening properties of the first sheet, wherein the first and second sheets of vibration dampening material are secured to each other and between the rigid sheets with major surface of the first sheet of dampening material in facing relationship to the first rigid sheet and major surface of the second sheet of dampening material in facing relationship to the second rigid sheet.

13. The article according to claim 12 wherein at least one of the rigid sheets is a glass sheet.

14. The article according to claim 12 wherein at least one of the rigid sheets is a metal sheet.

15. The article according to claim 12 wherein the major surface of the first dampening sheet is secured to the first rigid sheet by a plastic interlayer defined as a first interlayer.

16. The article according to claim 15 wherein the major surface of the second sheet of dampening material is adhered to the second rigid sheet by a plastic interlayer defined as a second interlayer.

17. The article according to claim 16 wherein the sheets of dampening material have a soft surface and the interlayer has a hard surface, further including an intermediate sheet having a surface harder than the surface of the first interlayer between the first interlayer and the first sheet of dampening material and an intermediate sheet having a surface harder than the surface of the second interlayer between the second interlayer and the second sheet of dampening material.

18. The article according to claim 17 wherein the rigid sheets are glass sheets, the intermediate sheet is a polyester sheet, the interlayer is a polyvinyl butyral interlayer and the sheet of dampening material is a viscoelastic polymer.

19. The article according to claim 12 wherein an interlayer is between the first and second sheets of dampening material, the interlayer having an opposed major surfaces harder than surfaces of the first and second sheets of dampening material, further including an intermediate sheet between and adhering the first sheet of dampening material to a major surface of the interlayer and an intermediate sheet between and adhering the second dampening sheet to opposite major surface of the interlayer wherein the intermediate sheets have a surface harder than the surface of the interlayer.

20. The article according to claim 19 wherein the rigid sheets are glass sheets, the intermediate sheet is a PET sheet, the interlayer is an EVA sheet and the sheet of dampening material is a acrylic viscoelastic polymer.

21. The article according to claim 12 wherein the article is a transparency.

22. The article according to claim 21 wherein the transparency is an aircraft window.

23. The article according to claim 21 wherein the transparency is an automotive window.

24. The article according to claim 21 wherein the transparency is a window.

25. The article according to claim 12 wherein at least one surface of one of the rigid sheets has a coating.

26. An article comprising:

a first rigid sheet having a major surface;

a second rigid sheet having a major surface;

a sheet of dampening material between the first and second rigid sheets;

wherein the sheet of dampening material is between the first and second rigid sheets and vibration of one rigid sheet is transmitted to the sheet of dampening material to dampen the vibration, and a molding around periphery edges of the first and second rigid sheets.

27. The dampening article according to claim 26 wherein the molding extends around and is secured to marginal edges of outer major surface of the rigid sheets.

28. The dampening article according to claim 27 further including a moisture and/or an impervious adhesive to secure the molding to the rigid sheets.

29. The article according to claim 26 wherein the article is a transparency.

30. The article according to claim 29 wherein the transparency is an aircraft window.

31. The article according to claim 29 wherein the transparency is an automotive window.

32. The article according to claim 29 wherein the transparency is a window.

33. The article according to claim 26 wherein at least one surface of one of the rigid sheets has a coating.

34. An aircraft transparency comprising:

a pair of glass sheets laminated together;

a sheet of dampening material on outer surface of one of the sheets, and a protective sheet over the sheet of dampening material.

35. A method of making an article comprising the steps of:

providing a sheet of dampening material having opposed tacky major surfaces;

placing a non-tacky sheet on each of the major surfaces of the sheet of dampening material;

positioning an interlayer on each of the non-tacky sheets;

positioning a glass sheet on each of the interlayers and joining the sheets and interlayer together to provide a sound dampening laminated article.

36. The method of claim 35 wherein the joining step is accomplished by subjecting the sheets and interlayers to heat and pressure.

* * * * *